United States Patent
Vedovati et al.

(10) Patent No.: US 12,175,312 B2
(45) Date of Patent: Dec. 24, 2024

(54) TECHNIQUES FOR VARIABLE MEMORY ALLOCATION USING CONSTANT-SIZED STRUCTURES

(71) Applicant: CrowdStrike, Inc., Sunnyvale, CA (US)

(72) Inventors: Marco Vedovati, Albino (IT); Martin Kelly, Bothell, WA (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 17/953,801

(22) Filed: Sep. 27, 2022

(65) Prior Publication Data

US 2024/0103944 A1 Mar. 28, 2024

(51) Int. Cl.
*G06F 9/54* (2006.01)

(52) U.S. Cl.
CPC .............. *G06F 9/546* (2013.01); *G06F 9/541* (2013.01); *G06F 9/544* (2013.01)

(58) Field of Classification Search
None
See application file for complete search history.

(56) References Cited

U.S. PATENT DOCUMENTS

| | | | |
|---|---|---|---|
| 10,572,405 B1 * | 2/2020 | Shen | B60R 16/0231 |
| 10,824,369 B2 * | 11/2020 | Venkataramani | G06F 13/28 |
| 2005/0262205 A1 * | 11/2005 | Nikolov | G06Q 10/107 |
| | | | 709/206 |
| 2006/0075119 A1 * | 4/2006 | Hussain | H04L 69/163 |
| | | | 709/227 |
| 2011/0061054 A1 * | 3/2011 | Hurley | G06F 9/546 |
| | | | 718/102 |
| 2011/0270944 A1 * | 11/2011 | Keilhau | G06F 9/545 |
| | | | 709/212 |
| 2013/0097615 A1 * | 4/2013 | Falco | G06F 9/546 |
| | | | 719/313 |
| 2019/0182304 A1 * | 6/2019 | Fok | H04L 65/70 |
| 2020/0028785 A1 * | 1/2020 | Ang | G06F 9/45558 |
| 2021/0097006 A1 * | 4/2021 | Masputra | G06F 12/1081 |
| 2022/0038557 A1 * | 2/2022 | Markuze | G06F 12/10 |
| 2023/0066013 A1 * | 3/2023 | Ball | G06F 9/545 |
| 2023/0155964 A1 * | 5/2023 | Henry | H04L 47/125 |
| | | | 370/412 |

FOREIGN PATENT DOCUMENTS

| | | | | |
|---|---|---|---|---|
| CN | 111400056 A | * | 7/2020 | G06F 9/546 |
| WO | WO 2017209876 A1 | * | 12/2017 | G06F 13/28 |

* cited by examiner

*Primary Examiner* — Charles E Anya
(74) *Attorney, Agent, or Firm* — Womble Bond Dickinson (US) LLP

(57) ABSTRACT

A first message structure is selected from a first subset of a plurality of message structures based on a size of a message payload and a message type of the message payload. Each of the first subset of the plurality of message structures has a different size. A size of the first message structure is greater than or equal to the size of the message payload. A first request is transmitted to an application programming interface (API) utilizing the size of the first message structure. In response to transmitting the first request to the API, a reference is received to a buffer structure. The message payload is copied into the buffer structure using the reference to the buffer structure.

20 Claims, 9 Drawing Sheets

TECHNIQUES FOR VARIABLE MEMORY ALLOCATION USING CONSTANT-SIZED STRUCTURES

TECHNICAL FIELD

Aspects of the present disclosure relate to memory allocation in code infrastructure, and more particularly, to variable memory allocation using message structures having a constant size.

BACKGROUND

Many modern operating systems are separated into a user space and a kernel space. The kernel space is typically more privileged, and may execute operations with an administrative privilege level that is protected from general access. One way to extend the functionality of an operating system (OS) may include the use of kernel drivers. Kernel modules may be separate modules which may be loaded into the operating system and execute with the administrative privilege level of the kernel within a structured framework. Kernel modules offer a way for those wishing to extend the functionality of the OS, such as hardware providers, to execute privileged operations.

In some scenarios, it may be beneficial to allow for execution of privileged operations through a more dynamic and/or secure interface than kernel drivers. One such mechanism is the extended Berkeley packet filter (eBPF). Infrastructure such as eBPF allows applications executing in user space to provide operational logic to be executed within the kernel space of the operating system. Such access, however, is performed after several verifications to accommodate security concerns. These verifications can increase the complexity of providing solutions for such infrastructures.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
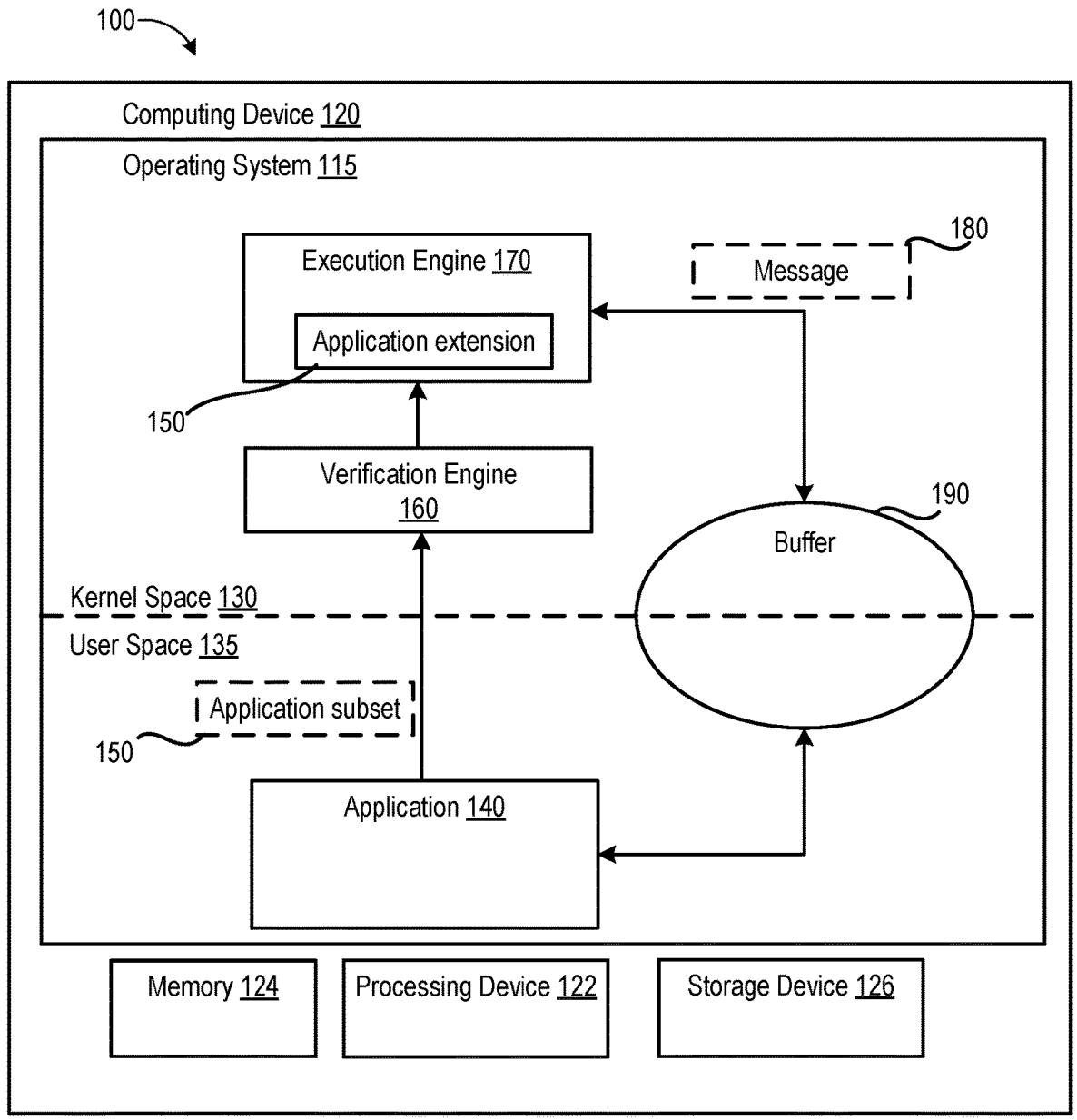
FIG. 1 is a block diagram that illustrates an example system, according to some embodiments of the present disclosure.

In infrastructures such as eBPF, where code is provided into the kernel space of the OS to execute, several security features may be present. For example, verification operations may be performed on the code that is to be run in the kernel space to confirm that the code will not expose vulnerabilities that may be exploited to access the kernel. These verification operations can include analysis of the flow of the operations of the code, a size of the code, and memory usage of the code.

In some cases, it may be useful for the code that is being run in the kernel to be able to communicate with applications running within the user space of the computing device. Because this is a potential point of vulnerability, the verification operations may impose additional checks on the messages passing between the user space and the kernel space. For example, the verification operation may utilize additional security checks if the memory being allocated for the messages is of a variable size. For example, the verification operations may analyze any code provided for execution in the kernel space to determine if the code allocates messages of a size that is unknown at the time of verification. An example of a variable size request is a request from the code running in the kernel space that attempts to allocate a message based on the size of a received network packet, which may be indeterminable at the time the code was submitted for verification. While this type of code might still be allowed to run in the kernel, the message request may be subject to additional operations, including additional memory copies, which may complicate the programming. Alternatively, to comply with the verification, typical code might simply allocate the maximum sized message buffer, regardless of the size of the payload of the message. As used herein, the message payload may refer to the data and/or values intended to be transmitted as part of the message. While this may comply with the verification operations, it may also result in a large amount of memory being reserved that may not be used, which is a potential waste of resources.

The present disclosure addresses the above-noted and other deficiencies by providing a technique for allocating message structures for variable sized message payloads that may still meet verification operations utilized in infrastructures similar to eBPF. In some embodiments described herein, multiple message structures may be provided, each having a different size. When memory for a message payload is to be allocated, the operations may select a smallest one of the multiple message structures that has a size sufficient to contain the message payload. In some embodiments, different types of messages may have differently-sized buckets of message structures, which may allow for variations in the size of the message structure to vary according to the type of the expected data.

The embodiments described herein provide improvements over some allocation techniques that interact with verification operations in infrastructures similar to eBPF. The techniques described herein avoid the additional operations and memory operations that may be necessary for variable-sized memory operations to comply with the verification operations, thus reducing a number of computer operations that are performed for the same types of messaging. In addition, embodiments of the present disclosure also avoid the need to allocate a maximum possible message buffer size to comply with the verification operations, reducing an overall amount of resources used, in some cases significantly. In this way, embodiments according to the present disclosure may provide a technological improvement that improves the operation of a computing device by reducing the complexity and number of operations of the executing instructions and/or reducing an amount of physical resources used by the instructions.

FIG. 1 is a block diagram that illustrates an example system 100, according to some embodiments of the present disclosure. FIG. 1 and the other figures may use like reference numerals to identify like elements. Thus, the same or similar numbers may be described with reference to other drawings even if they are neither mentioned nor described in the corresponding drawing. Also, elements that are not denoted by reference numbers may be described with reference to other drawings. A letter after a reference numeral, such as "110A," indicates that the text refers specifically to the element having that particular reference numeral. A reference numeral in the text without a following letter, such as "110," refers to any or all of the elements in the figures bearing that reference numeral.

As illustrated in FIG. 1, the system 100 includes a computing device 120. The computing device 120 may include hardware such as processing device 122 (e.g., processors, central processing units (CPUs)), memory 124 (e.g., random access memory (RAM), storage devices 126 (e.g., hard-disk drive (HDD)), and solid-state drives (SSD), etc.), and other hardware devices (e.g., sound card, video card, etc.).

A storage device 126 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

The computing device 120 may comprise any suitable type of computing device or machine that has a programmable processor including, for example, server computers, desktop computers, laptop computers, tablet computers, smartphones, set-top boxes, etc. In some examples, the computing device 120 may comprise a single machine or may include multiple interconnected machines (e.g., multiple servers configured in a cluster). The computing device 120 may be implemented by a common entity/organization or may be implemented by different entities/organizations.

The computing device 120 may execute an operating system 115. The operating system 115 of computing device 120 may manage the execution of other components (e.g., software, applications, etc.) and/or may manage access to the hardware (e.g., processing device(s) 122, memory 124, and/or storage devices 126, etc.) of the computing device 120. Operating system 115 may be software to provide an interface between the computing hardware (e.g., processing device 122 and/or storage device 126) and applications running on the operating system 115. Operating system 115 may include a kernel space 130 and a user space 135 supporting the execution of one or more applications 140.

Though only a single application 140 is illustrated in FIG. 1, it will be understood that a plurality of applications 140 may be present. Operating system kernel space 130 may include several operating system functionalities, including but not limited to process management, hardware interfaces, access control and the like. Functions executing within the kernel space 130 may execute with an elevated privilege and may manage the administration of the operating system 115. Examples of operating systems 115 include WINDOWS™, LINUX™, ANDROID™, IOS™, and MACOS™.

As illustrated in FIG. 1, computing device 120 may execute (e.g., using processing device 122) an application 140. Application 140 may be a desktop application, a network application, a security application, a database application, or any other application that may be executed by the operating system 115. In some embodiments, the application 140 may include functionality represented by an application extension 150 that is to be executed in the kernel space 130. The application extension 150 may be or include executable instructions that are provided by the application 140 to the kernel space 130, to be executed within the kernel space 130 utilizing the administrative privileges and/or access of the kernel space 130.

The application 140 may provide the application extension 150 to execution engine 170 within the kernel space 130. In some embodiments, the application extension 150 may be or include bytecode, though the embodiments of the present disclosure are not limited to such a configuration. In some embodiments, bytecode includes object code that may be converted to machine code (e.g., binary instructions compatible with processing device 122) by the execution engine 170.

The execution engine 170 may execute the application extension 150 within the context of the kernel space 130. For example, the execution engine 170 may execute the application extension 150 with the administrative privileges and access of the kernel space 130. This may allow the application extension 150 to perform privileged operations not available to the application 140 executing in user space 135.

To assist in security of the operating system 115, a verification engine 160 may be used to verify the operation and/or security of the application extension 150. For example, prior to executing the application extension 150 by the execution engine 170, the verification engine 160 may examine the structure and/or instructions of the application extension 150 to determine if they meet one or more defined criteria for executing in kernel space. For example, the verification engine 160 may analyze the flow of the operations of the code of the application extension 150, a size of the code of the application extension 150, and memory usage of the application extension 150. In some embodiments, a satisfactory analysis result by the verification engine 160 may be a prerequisite to execution of the application extension 150 by the execution engine 170.

In some embodiments, while executing, the application extension 150 may exchange one or more messages 180 with application 140. In some embodiments, the message 180 may be exchanged utilizing a buffer 190. The application extension 150 may store message 180 into buffer 190 for retrieval by the application 140. In some embodiments, the message 180 may be stored in memory (e.g., memory 124) allocated within the buffer 190. In some embodiments, the buffer 190 may be a ring buffer. A ring buffer includes data structures that utilize a linear buffer in memory that is accessed as if it were connected end-to-end (e.g., circularly). In some embodiments, a ring buffer may be accessed in a first-in-first-out (FIFO) manner.

The use of the buffer 190 may allow the application extension 150 to exchange data and/or other message payloads with the application 140 using the messages 180. For example, the application extension 150 may perform a network monitoring function that is capable of analyzing all incoming network packets as a result of its execution within the privileged kernel space 130. The application extension 150 may be able to analyze the incoming network packets and inform the application 140 of the results of the analysis (e.g., an appraisal of incoming threats from the network traffic) by using message 180.

Because the use of the buffer 190 may allow for memory allocation by the application extension 150, the memory allocation may be scrutinized as part of the operations of the verification engine 160. For example, the verification engine 160 may analyze the instructions of the application extension 150 to determine the parameters of any memory allocation to determine if they may represent a risk to the operating system 115. For example, the verification engine 160 may analyze the application extension 150 to determine if one or more of the memory allocations may attempt to reserve memory allocation sizes that would result in a significant and/or excessive usage of memory or other risk to the operating system 115. In some embodiments, the verification engine 160 may analyze the application extension 150 to determine and/or prevent accesses to memory outside of the boundaries of the buffer 190 and/or access to memory that overwrites data not yet consumed by the application 140 in user space 130.

In some embodiments, the verification engine 160 may, among other things, analyze the size of memory allocated by the application extension 150. For example, the verification engine 160 may analyze the operating instructions of the application extension 150 prior to execution to determine if memory is being allocated and, if so, whether the memory is of a known (e.g., constant) size. For example, a memory allocation within the operating instructions of the application extension 150 that allocates a fixed number of bytes (e.g., 256 bytes) may be determined as a constant memory allocation. In contrast, a memory allocation whose size is variable (e.g., non-determinable) prior to execution (e.g., at compile time and/or in compiled form), such as an allocation of a number of bytes equal to a size of a received data packet, may be determined as a variable memory allocation.

Because a variable memory allocation may represent a potential risk to the operating system 115, it may be handled differently by the verification engine 160. For example, memory allocations that vary in sized based on runtime data may be forced to follow a different set of operations to be approved by the verification engine 160. In contrast, memory allocations that are constant in size may be allowed to utilize more streamlined procedures. As a result, memory allocations by the application extension 150, such as those of the message 180 for the buffer 190, that are variable in size may be required by the verification engine 160 to perform additional operations in order to execute within the execution engine 170.

Figure 2A:
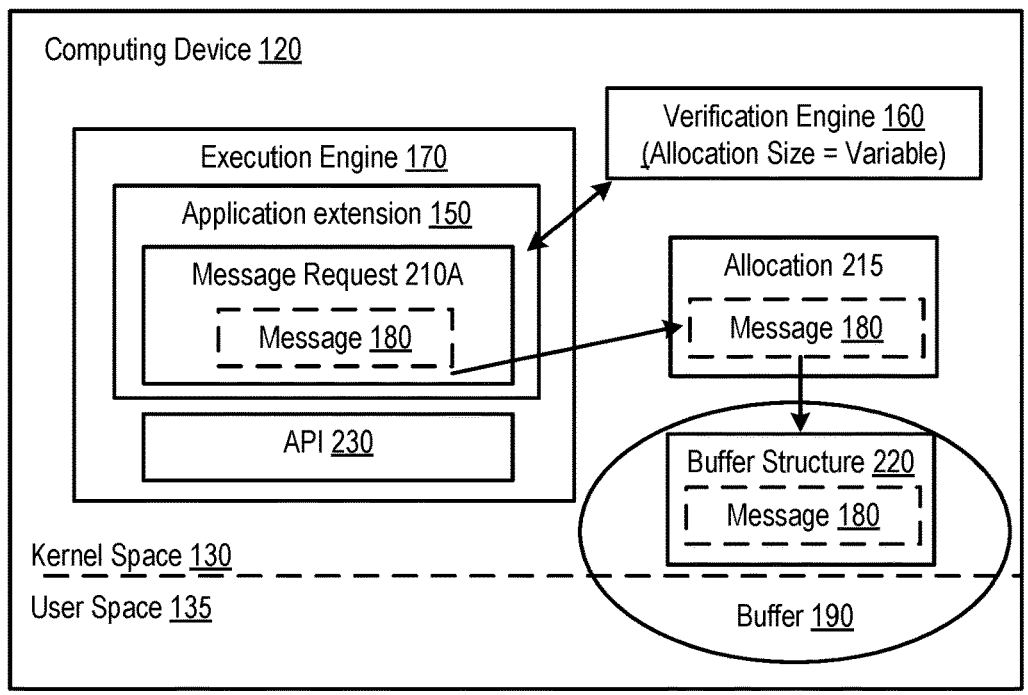
FIG. 2A is a block diagram illustrating an example of a variable-sized message request of a buffer structure for a message, according to some embodiments of the present disclosure.
Figure 2B:
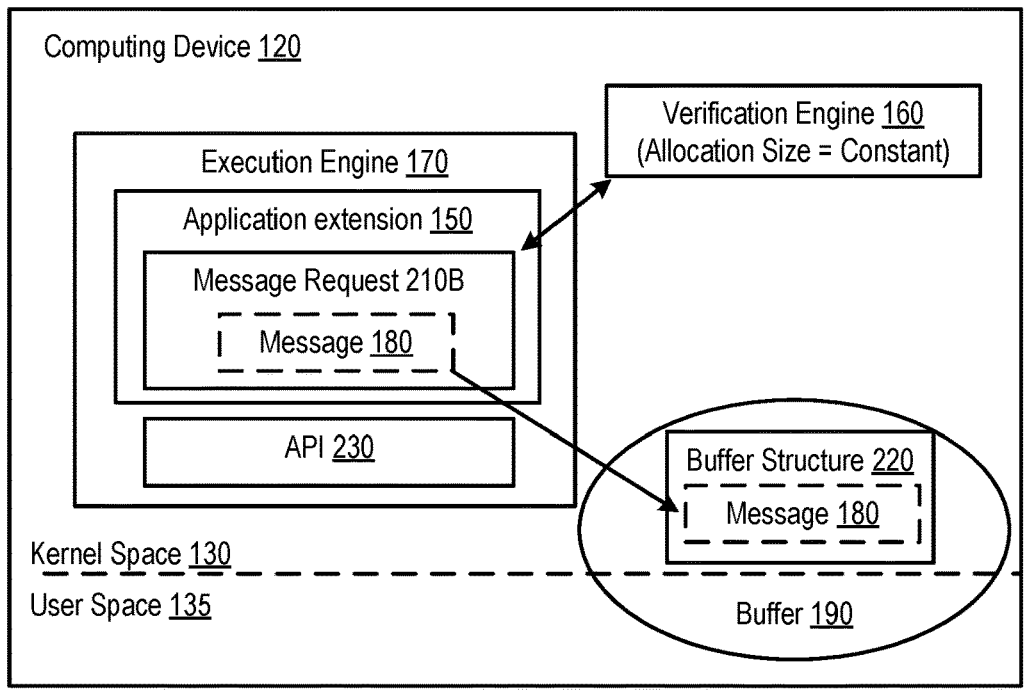
FIG. 2B is a block diagram illustrating an example of a constant-sized message request of a buffer structure for a message, according to some embodiments of the present disclosure.

FIGS. 2A and 2B are block diagrams illustrating examples of a message request for variable-sized and constant-sized messages, respectively, for a message, according to some embodiments of the present disclosure. FIGS. 2A and 2B are examples only, and are not intended to limit the embodiments of the present disclosure.

FIG. 2A is a block diagram illustrating an example of a variable-sized message request of a buffer structure 220 for a message 180, in accordance with some embodiments of the present disclosure. Referring to FIG. 2A, as part of an operation of the application extension 150 within the execution engine 170, the application extension 150 may perform a message request 210A (e.g., a message request operation 210A as indicated by one or more instructions of the application extension 150). For example, the message request operation 210A may request a buffer structure 220 from an application programming interface (API) 230 and/or allocate structures associated with the message 180. In some embodiments, the message request operation 210A may include a size of the buffer structure 220 that is requested. As part of the analysis of the application extension 150 by the verification engine 160, the verification engine 160 may analyze the message request 210A prior to execution of the application extension 150. The verification engine 160 may determine (e.g., as part of the analysis of the instruction code of the application extension 150) that the message request operation 210A is of a size that is variable (e.g., not determinable at the time of analysis). As discussed herein, this variable-sized request may be due to the size of the buffer structure 220 that is requested being based on a size of data to be included in the message 180 that may not be known at the compile time of the application extension 150 and/or determinable from analysis of the code of the application extension 150.

If the size of the message request 210A is variable, the verification engine 160 may require that the application extension 150 perform a copy of the message 180 into an auxiliary allocation 215 prior to submitting the message 180 to the buffer 190. For example, the application extension 150 may copy the message 180 into the auxiliary allocation 215 and call the API 230 to submit the auxiliary allocation 215 to the buffer 190. The API 230 may copy the message 180 from the auxiliary allocation 215 into a buffer structure 220 within the buffer 190. The call to the API 230 may allow for the auxiliary allocation 215 to be examined prior to being submitted to the buffer 190. In some embodiments, the verification engine 160 may not allow the application extension 150 direct access to the buffer structure 220 within the buffer 190 for messages 180 that are based on variable sized message requests (e.g., not determinable at compile time and/or from the instruction code of the application extension 150).

In some embodiments, instantiations of application extensions 150 that do not perform the appropriate operation (e.g., the additional memory copy of the message 180 for the call to the API 230) for a message 180 that may be of variable size may not be approved for operation within the execution engine 170 by the verification engine 160. That is to say that, in some embodiments, the verification engine 160 may not automatically adjust the operations of the application extension 150 if non-compliant, but may simply refuse to allow the application extension 150 to be executed within the execution engine 170.

FIG. 2B is a block diagram illustrating an example of a constant-sized message request of a buffer structure 220 for a message 180, in accordance with some embodiments of the present disclosure. Referring to FIG. 2B, as part of an operation of the application extension 150 within the execution engine 170, the application extension 150 may perform a message request 210B (e.g., a message request operation 210B as indicated by one or more instructions of the application extension 150). For example, the message request operation 210B may request a buffer structure 220 from the API 230 and/or allocate structures associated with the message 180. For example, the request to the API 230 may include a size of the buffer structure 220 to be requested. As part of the analysis of the application extension 150 by the verification engine 160, the verification engine 160 may analyze the message request 210B prior to execution of the application extension 150. The verification engine 160 may determine (e.g., as part of the analysis of the instruction code of the application extension 150) that the message request operation 210B is of a size that is constant (e.g., determinable at the time of analysis). For example, the message request 210B may be of a fixed and/or constant size within the instructions of the application extension 150.

If the size of the message request 210B is constant, the verification engine 160 may allow the application extension 150 to perform a more streamlined operation than that of FIG. 2A. For example, the verification engine 160 may provide a reference to a buffer structure 220 within the buffer 190 and allow the application extension 150 to copy the message 180 directly into the buffer structure 220. For example, the application extension 150 may submit a request to the API 230 to reserve a buffer structure 220 in the buffer 190. The API 230 may return an address (e.g., a pointer or other reference to the location of the buffer structure 220 in memory 124) which the application extension 150 may use to copy (e.g., directly copy) the message 180 into the buffer structure 220.

In some embodiments, the examples of FIGS. 2A and 2B, as well as the infrastructure of FIG. 1, may be an eBPF infrastructure. In such embodiments, the execution engine 170 may be an eBPF virtual machine (VM). The eBPF VM may be capable of running just-in-time compiled programs inside the operating system 115, which may be a LINUX-based operating system 115.

The application extension 150 may include eBPF programs executed by the eBPF VM. In some embodiments, the eBPF programs are executed when particular events occur within the kernel space 130 of the operating system 115. The application extension 150 may store information in maps (which may be data structures manipulated by the eBPF infrastructure), write to buffers 190, and/or call a subset of kernel functions.

In an eBPF environment, application extensions 150 utilizing variable-sized memory allocations, such as those illustrated in FIG. 2A, are to use an output command from the API 230 (e.g., bpf_ringbuf_output( )). As discussed, the utilizing of this function requires an additional memory copy of the message payload to a sample to provide to the bpf_ringbuf_output( ) call. The use of the output request for variable-sized message allocations is enforced by the verification engine 160, known as a verifier in eBPF.

In contrast, in an eBPF environment, application extensions 150 utilizing constant-sized message allocations, such as those illustrated in FIG. 2B, may utilize a reserve command from the API 230 (e.g., bpf_ringbuf_reserve( )) that reserves a buffer structure 220 in the buffer 190. The application extension 150 may then copy the message 180 directly into the buffer structure 220. The application extension 150 may then perform a commit request to the API 230 (e.g., bpf_ringbuf_commit( )) that submits the buffer structure 220 for processing within the buffer 190. The use of the higher-performing reserve/commit requests for constant-sized message allocations is allowed by the verification engine 160 in eBPF.

In some cases, the use of the bpf_ringbuf_reserve( ) API of FIG. 2B over the bpf_ringbuf_output( ) API of FIG. 2B may include additional advantages. For example, the bpf_ringbuf_reserve( ) API may also result in a better application performance by reducing the contention over the ring buffer access from multiple producers (e.g., multiple CPUs). When using the bpf_ringbuf_output( ) API, copy requests by multiple CPUs to the ring buffers may be serialized. However, when using the bpf_ringbuf_reserve( ) API, writing can be done concurrently, resulting in a higher performance.

Referring to FIGS. 1, 2A, and 2B, operations associated with the transfer of messages 180 between the application extension 150 and the application 140 using the buffer 190 utilize different operations depending on whether a size of a buffer structure 220 to be allocated/requested for the message 180 is variable (e.g., unknown at compile time) or constant (e.g., known at compile time). Message allocations based on sizes that may vary dynamically during operation of the application extension 150 may be subject, at least, to an extra memory copy (as illustrated by the auxiliary allocation 215 of FIG. 2A. This may result in both a performance penalty as well as a resource penalty for such operations.

The application extension 150 may avoid this penalty by only utilizing message allocations for messages 180 that utilize constant sizes (e.g., that do not dynamically change during operation of the application extension 150). However, this can be problematic in situations in which the size of the message 180 may vary widely. For example, if the message 180 is to include a size of a file path, it may range from just a few characters to several hundred characters in size. To support operations with only constant message allocations, the application extension 150 may utilize a maximum size message allocation. For example, the application extension 150 may always allocate a maximum size buffer structure 220 (e.g., as a constant message allocation) to cover all possible cases that may be encountered. For the example of the file path, the instructions of the application extension 150 may perform a message allocation for the message 180 that is of the maximum size of the file path, so any size of the file path may be accommodated while still meeting the requirement for constant message allocation levied by the verification engine 160 so as to use the streamlined allocation operation of FIG. 2B. This scenario, however, is also potentially wasteful. Though the use of maximum-sized buffers may avoid an extra memory copy, it utilizes the worst-case scenario for message allocation. This may result in a wasteful memory allocation for a buffer structure 220 of a maximum potential size when the actual size needed may be much less. Therefore, while this potential solution may perform better than that of a variable-sized message allocation, it results in an increased use of resources, which may be disadvantageous.

Some embodiments of the present disclosure provide a solution to the above-referenced difficulty by utilizing constant-sized message allocations even in cases where the size of the data is not directly known in advance, which allows the use of the higher-performing operations illustrated in FIG. 2B. The operations described herein may conditionally select from a pre-defined set of known message sizes for message allocations that are not known in advance. Though the size of the message allocation is not known in advance, the code instructions may limit the logic flow of the application extension 150 such that the size of the message allocation needed is compared against the known set of message sizes, and each code path results in a message allocation of one of those sizes.

An example of pseudocode performing such a comparison for a message payload known to have a maximum size of 7 bytes to select a message structure to contain the message payload is included below:

```
if (size of message needed <= 2)
    select message structure of size 2;
else if (size of message needed <= 5)
    select message structure of size 5;
else
    select message structure of size 7 (MAXIMUM);
```

In the above non-limiting example, the message size needed is unknown in advance. However, each of the code paths results in an allocation of a message structure of a fixed size. Thus, even though the size of the message to be allocated is unknown, each potential code path results in a fixed-size message allocation. Such a set of instructions will satisfy the verification engine 160 and allow the use of the streamlined access to the buffer 190 for the selected message structure.

In FIG. 1, though the execution engine 170 and the verification engine 160 are illustrated as separate components, this is only for the sake of simplicity of illustration. In some embodiments, the execution engine 170 and the verification engine 160 may be combined with other components. Similarly, though the execution engine 170 and the verification engine 160 are illustrated as separate from other components of the computing device 120 (e.g., from memory 124), this is only for ease of discussion. In some embodiments, one or more of the execution engine 170 and the verification engine 160 may be resident in memory 124 (e.g., as executable code instructions).

Figure 3:
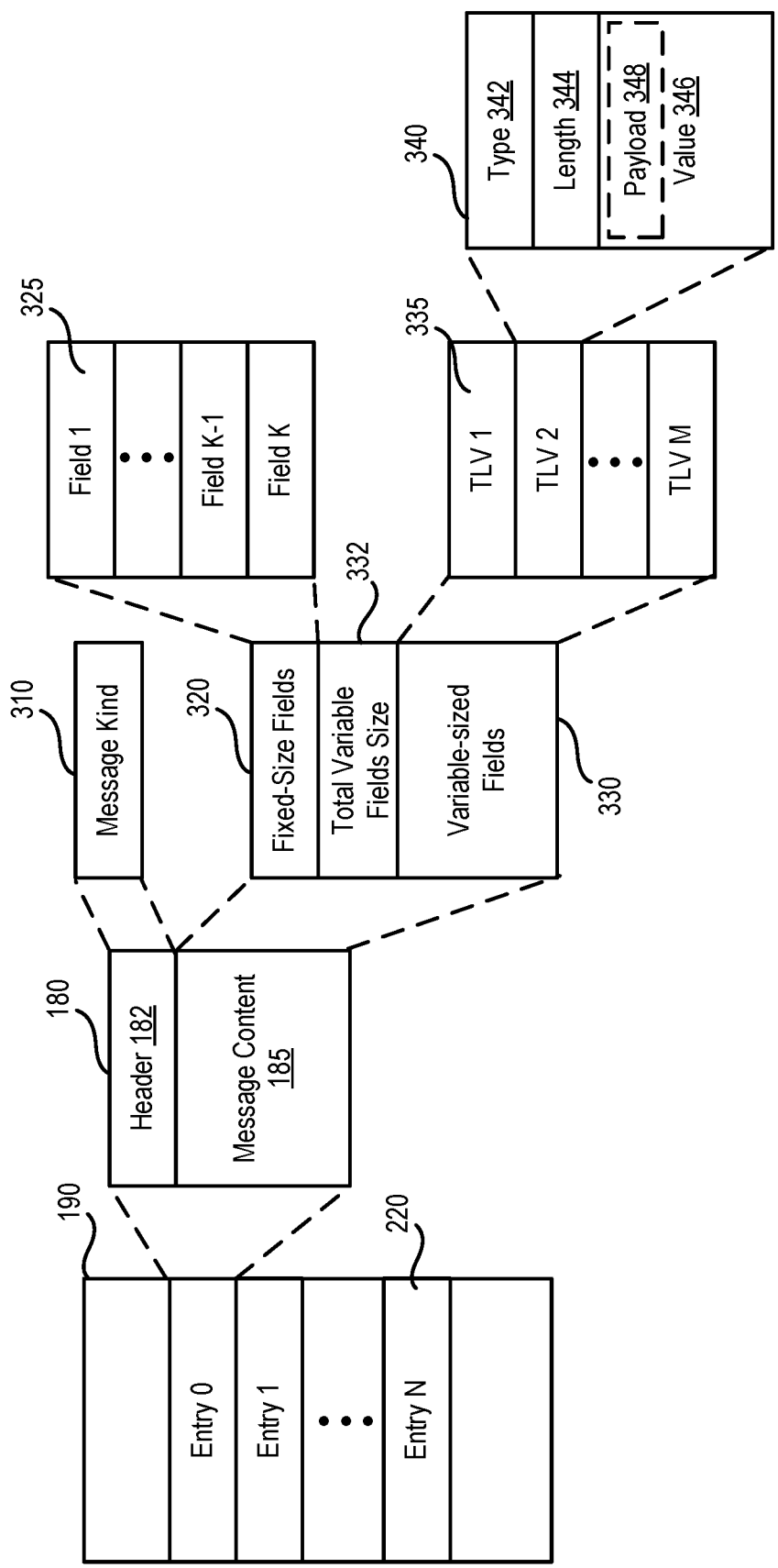
FIG. 3 is an example of a message, according to some embodiments of the present disclosure.

FIG. 3 is an example of a message 180, according to some embodiments of the present disclosure. A description of elements of FIG. 3 that have been previously described will be omitted for brevity.

Referring to FIG. 3, the message 180 may be part of the contents of a buffer structure 220 in the buffer 190. The buffer 190 may include a plurality of buffer structures 220 (N are illustrated in FIG. 3 as an example). In some embodiments, the buffer structures 220 may be organized in a ring buffer, though the embodiments of the present disclosure are not limited thereto. As previously described, the buffer 190 may be formed as part of memory 124 of a computing device 120.

Message 180 may include header 182 and content 185. The message header 182 may include data and/or metadata describing the message 180. For example, the message header 182 may include, for example, information about a size of the message, a destination of the message, and/or a kind/type of the message 310, though the embodiments of the present disclosure are not limited thereto. The message content 185 may include, among other possible contents, a fixed-size fields segment 320, a variable-sized fields segment 330, and a total size 332 of the variable-sized fields segment 330.

The fixed-size fields segment 320 may include a plurality of fields 325, each of a known size. In FIG. 3, K fixed-size fields 325 are illustrated as an example. In some embodiments, both a number (e.g., K) of the fixed-size fields 325 and a size of the fixed-sized fields 325 may be known in advance, such that a total size of the fixed-size fields 325 may be known in advance.

The variable-size fields segment 330 may also include a plurality of fields 335, though, in some embodiments, none may be present (e.g., only fixed-size fields 325 are in the message contents 185). The size of the variable-sized fields 335 may not be known in advance and may vary from one message 180 to the next. In FIG. 3, M variable-size fields 335 are illustrated as an example. In some embodiments, both a number (e.g., M) of the variable-size fields 335 and a total size 332 of the variable-sized fields 335 may not be known in advance. As a result, the total size 332 of the total number of variable sized fields 335 may be provided as part of the message content 185 once it is determined.

To accommodate information of a variable size, the variable-sized fields 335 may contain a type-length-value (TLV) structure 340. The TLV structure 340 may include a type 342, a length 344, and a value 346. The TLV structure 340 will also be referred to herein as a message structure 340.

The value 346 may include a message payload 348 associated with the message structure 340. The message payload 348 may include data to be sent as part of the message 180. As illustrated in FIG. 3, the message 180 may include multiple message structures 340 and thus may include multiple message payloads 348, though the embodiments of the present disclosure are not limited to such a configuration. The message payload 348 may include a particular size of data (e.g., a number of bytes of memory) that may not be known in advance (e.g., at compile time). In other words, the message payload 348 may be of variable size.

The size (e.g., of the memory) of the value 346 may vary within different ones of the plurality of message structures 340. The length portion 344 of the message structure 340 may indicate a size of the value 346. The type portion 342 of the message structure 340 may indicate a type of the data within the value section 346. When a plurality of message structures 340 are included as part of the variable-sized fields segment 330 of the message 180, the different message structures 340 may be traversed by examining the type 342 of the message structure 340 and the length 344 of the value segment 346 of the message structure 340. The length 344 of the of the value segment 346 will indicate when the next message structure 340 begins within the variable-sized fields segment 330. Thus, the TLV arrangement of the message structure 340, along with the provided total size 332 of the variable-sized field segment 330, allows for the variable-sized data to be processed.

Figure 4:
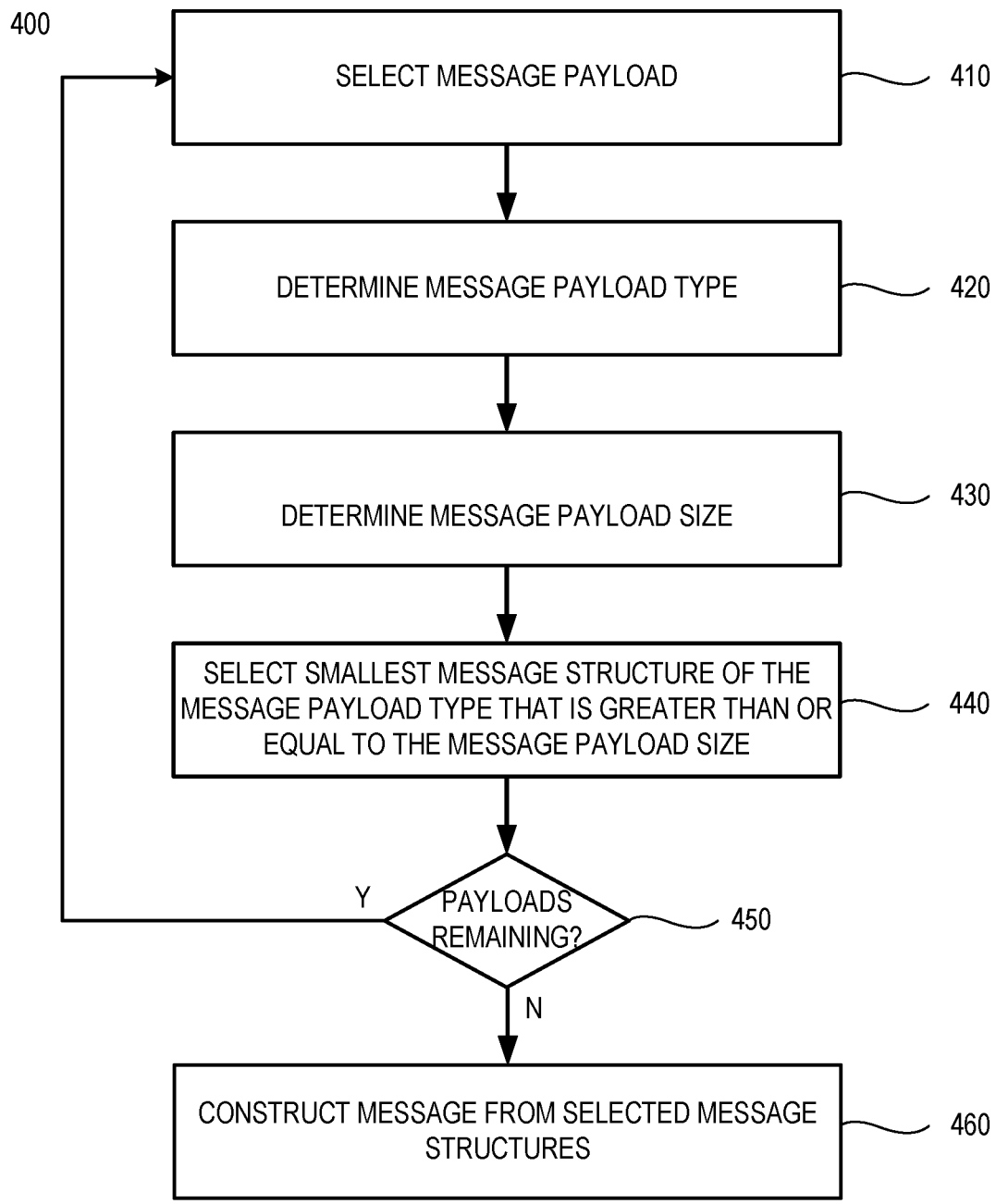
FIG. 4 is a flow diagram of a method of generating a message for variable-sized data, according to some embodiments of the present disclosure.

FIG. 4 is a flow diagram of a method 400 of generating a message 180 for variable-sized data, according to some embodiments of the present disclosure. A description of elements of FIG. 4 that have been previously described will be omitted for brevity. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120).

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring simultaneously to FIGS. 1 and 3 as well, the method 400 begins at block 410, in which a message payload 348 is selected. The message payload 348 may include a portion of data to be transmitted as part of the message 180. The message payload 348 may include a particular size of data (e.g., a number of bytes of memory)

that may not be known in advance (e.g., at compile time). In other words, the message payload 348 may be of variable size.

At block 420, a type of the message payload 348 may be determined. The type of the message payload 348 may be a category or other characteristic of the message payload data 348. For example, the message payload type may indicate that the message payload 348 is a file path, a particular type of network packet, string data, or the like. In some embodiments, the type of the message payload 348 may correspond to a type 342 of the TLV structure that will be used as the message structure 340 for the message payload 348, but the embodiments of the present disclosure are not limited thereto.

At block 430, a size of the message payload 348 may be determined. For example, an amount of memory (e.g., the number of bytes of memory) of the message payload 348 may be determined and/or counted.

At block 440, a plurality of message structures 340 may be analyzed to determine a subset of the message structures 340 that have the same type as the message payload type determined in operation 430. The subset of the message structures 340 may include one or more message structures 340 having different sizes from one another. Further detail with respect to the configuration of the message structures 340 will be illustrated with respect to FIG. 5.

Figure 5:
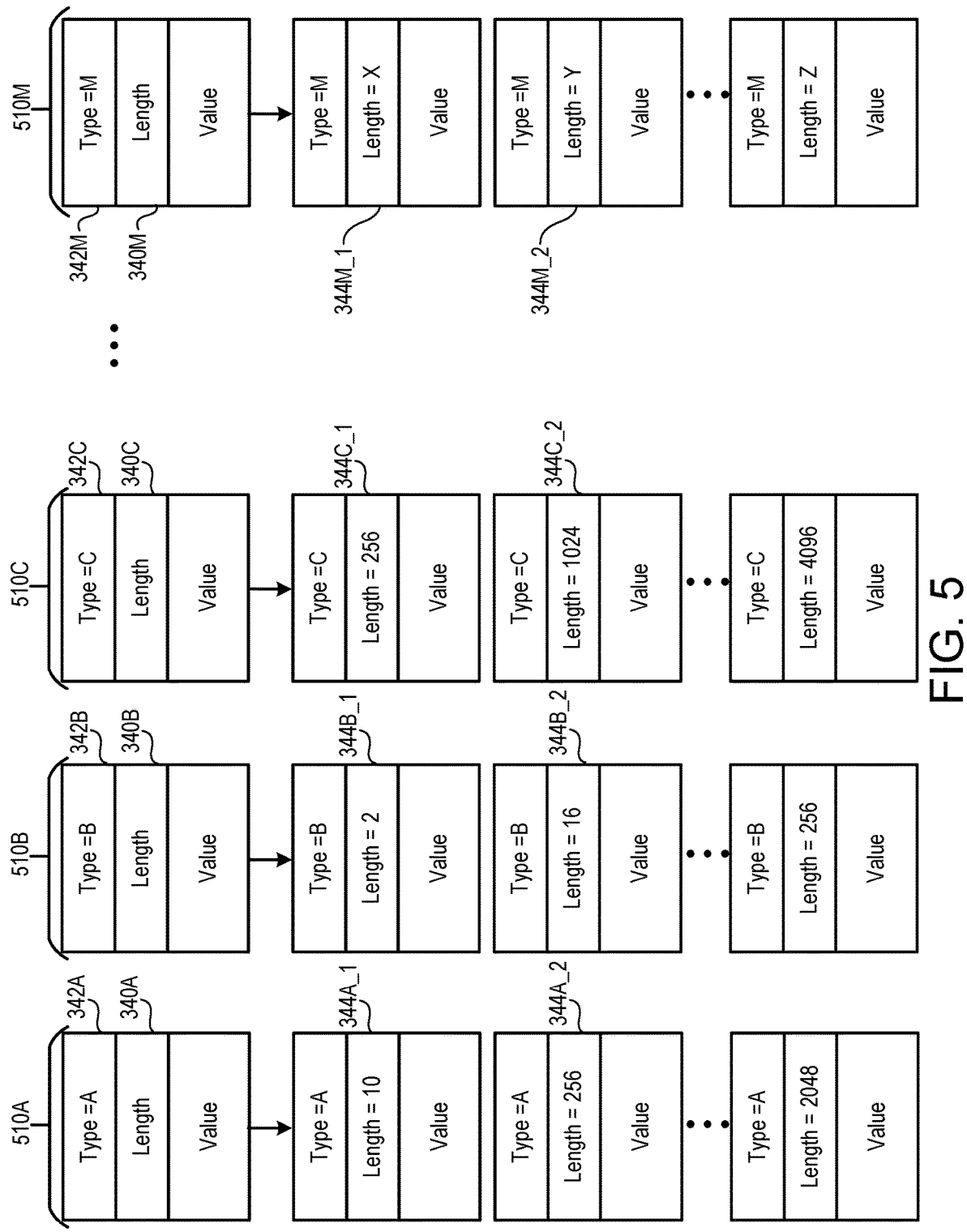
FIG. 5 is a block diagram illustrating a configuration of message structures, according to some embodiments of the present disclosure.

FIG. 5 is a block diagram illustrating a configuration of message structures 340, according to some embodiments of the present disclosure. A description of elements of FIG. 5 that have been previously discussed will be omitted for brevity.

Referring to FIG. 5, some embodiments of the present disclosure may provide multiple sizes of given message structures 340 for each of a plurality of message types. For example, as illustrated in FIG. 5, a plurality of different message structures 340 may be provided with different subsets 510 of message structures 340 associated with different message types 342. Within a given subset 510 of the message structures 340, multiple fixed sizes of message structures 340 may be provided.

For example, as illustrated in FIG. 5, different subsets 510 of the message structures 340 may be associated with each of M types 342 of message structure 340. For example, a first subset 510A may be associated with first message structures 340A having a first message type 342A of type "A". Here, "A" is merely a placeholder intended to refer to a particular type of message and not intended necessarily be a particular message type 342.

Each of the first message structures 340A of the first subset 510A may have the same first message type 342A. Moreover, a plurality of these first message structures 340A may be provided, each having a different constant size as illustrated by the length 344A of the first message structure 340A. As a non-limiting example, a first of the first message structures 340A may have a size 344A_1 of length 10, a second of the first message structures 340A may have a size 344A_2 of length 256, and a third of the first message structures 340A may have a size of length 2048. In some embodiments, different TLV structures having different lengths (e.g., sizes) may be provided as a message structure 340 for a particular message type 342. In some embodiments, at least one of the messages structures 340 for a particular subset 510 associated with a particular message type 342 may have a size large enough to contain the maximum message size for that particular message type 342.

Similarly, a second subset 510B may be associated with second message structures 340B having a second message type 342B of type "B". Here, "B" is merely a placeholder intended to refer to a particular type of message and not intended necessarily be a particular message type 342.

Each of the second message structures 340B of the second subset 510B may have the same second message type 342B, and a plurality of these second message structures 340B may be provided, each having a different constant size as illustrated by the length 344B of the second message structure 340B. As a non-limiting example, a first of the second message structures 340B may have a size 344B_1 of length 2, a second of the second message structures 340B may have a size 344B_2 of length 16, and a third of the second message structures 340B may have a size 344 of length 256. Thus, the sizes provided for the message structures 340 of one of the subsets 510 of the messages structures 340 associated with a particular message type 342 may be different (e.g., smaller or larger) than the sizes 344 provided for the message structures 340 of another of the subsets 510 of the messages structures 340 associated with a different message type 342. In addition, in some embodiments, a number of the second message structures 340B of the second subset 510B may be different than a number of the message structures 340 of another of the subsets 510 of the messages structures 340 associated with a different message type 342

A third subset 510C may be associated with second message structures 340C having a third message type 342C of type "C". The third subset may include third message structures 340C, including third message structures 340C having different sizes 344C_1 and 344C_2. FIG. 5 also illustrates that each of the subsets 510, up to a Mth subset 510M may have different sizes 344 for the message structures 340M associated with the subset (including, as illustrated in FIG. 5, sizes/lengths 344M_1 and 344M_2. It will be understood that not all of the subsets 510 of the message structures 340 will have different sizes 344. In some embodiments, two or more of the subsets 510 of the message structures 340 may include message structures 340 the same sizes 344 as one another. For example, as illustrated in FIG. 5, one of the first message structures 340A associated with the first message type 342A has a same size 344 of 256 bytes as one of the third message structures 340C associated with the third message types 342C.

The configuration illustrated in FIG. 5 provides a number of different buckets of sizes 344 for its message structures 340. When selecting a message structure 340 for a particular message 340, the message allocation instructions (e.g., the instructions of the application extension 150) may select one of the message structures 340 having the closest size to the amount of space needed for a given message payload 348 while still being large enough to contain the message payload 348.

Referring back to FIG. 4 and operation 440, the type of the message payload 348 may be compared to the different types 342 of subsets 510 of the plurality of message structures 340 until a subset 510 is found that has the same type 342 as the message payload type determined in operation 430. As described with respect to FIG. 5, the subset 510 may include one or more message structures 340 having a different length and/or size 344. The size 344 of the message structures 340 of the given subset 510 may be compared until a message structure 340 is found having the smallest size 344 that is still greater than or equal to the determined size of the message payload 348. Stated another way, a smallest message structure 340 is selected, from the subset 510 of message structures 340 for a particular message type 342, that is large enough to contain the message payload 348.

In block 450, it may be determined if more message payloads 348 are available to be part of the message 180. If so ('Y' in FIG. 4) the operations may begin again with block 410 and a new message payload 348. The new message payload 348 may be processed and another message structure 340 may be selected for the new message payload 348 based on the size and the type of the message payload 348.

If no further message payloads 348 are available ('N' in FIG. 4), the method may continue with block 460 in which the message 180 is constructed from the message structures 340 selected in the prior operations. The message 180 may then be sent to the buffer 190 utilizing a request to the API 230 as illustrated in FIG. 2B.

The method of FIG. 4 provides the ability for code instructions executing in environments similar to eBPF to perform constant-sized message allocations despite the fact that the code may not know, in advance, the size of the memory allocations that are to be made. Since at least one of the message structures 340 having a fixed size will be selected, the memory allocation will ultimately be a fixed size. Thus, a verification engine 160 may permit the use of streamlined buffer operations similar to those illustrated in FIG. 2B.

Figure 6:
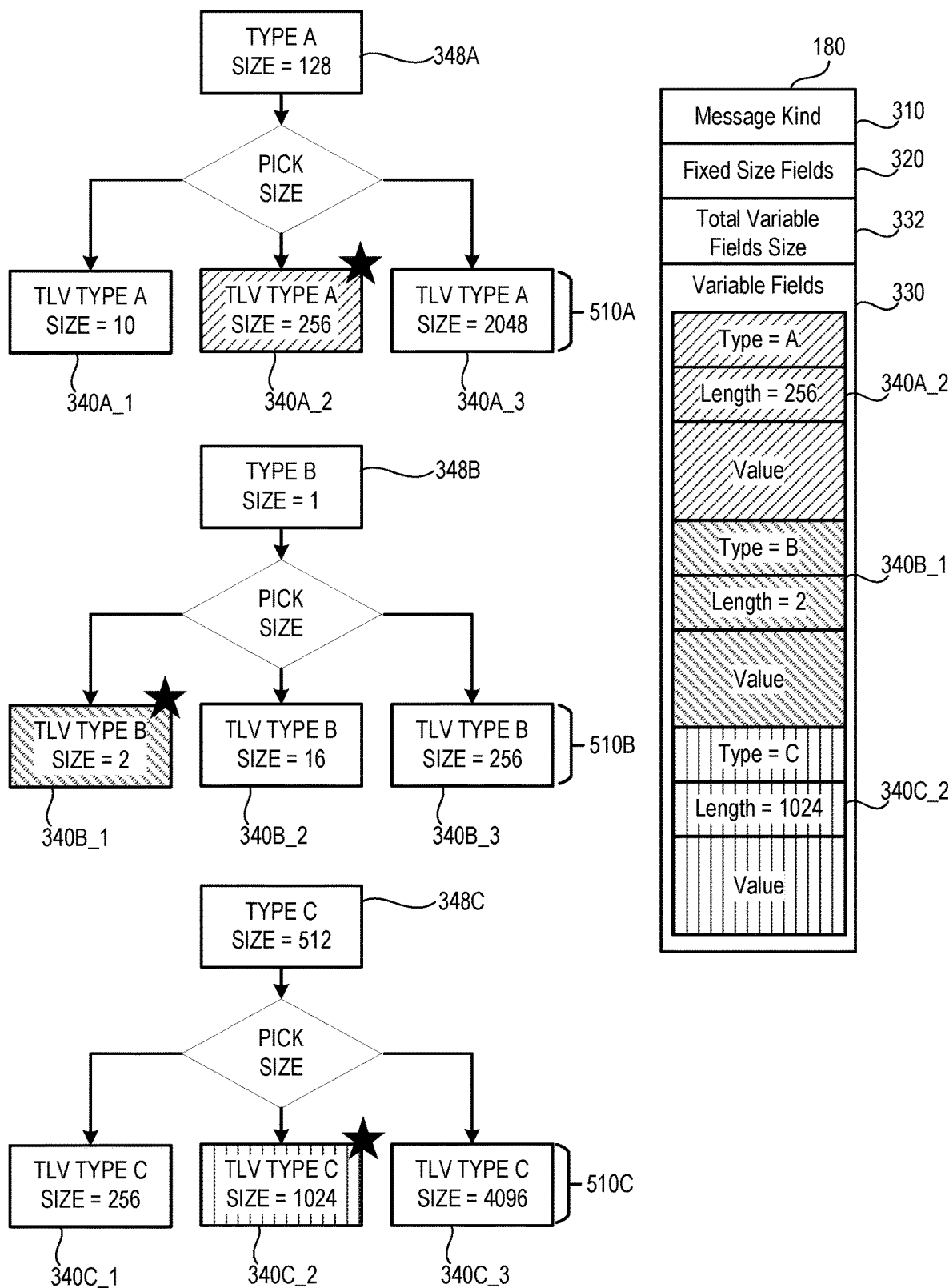
FIG. 6 is a block diagram illustrating an example operation of the method of FIG. 4, in accordance with some embodiments of the present disclosure.

FIG. 6 is a block diagram illustrating an example operation of the method of FIG. 4, in accordance with some embodiments of the present disclosure. The example of FIG. 6 is provided to give additional detail to the method 400 described with respect to FIG. 4, and is not intended to limit the embodiments of the present disclosure.

Referring to FIG. 6, an example is illustrated in which three message payloads are present, having message payloads 348 of types "A," "B," and "C." As previously discussed, these are merely example types and are not intended to limit the embodiments of the present disclosure.

A first message payload 348A may be received having a first message payload type of "A" and the first message payload 348A may have a size of 128 bytes. A subset 510A of the available message structures 340 may be determined that are associated with the first type (e.g., the first subset 510A of FIG. 5). The subset 510A may include message structures 340 having different sizes. For example, the subset 510A associated with the type of "A" may have a first message structure 340A_1 supporting a message payload of 10 bytes, a second message structure 340A_2 supporting a message payload of 256 bytes, and a third message structure 340A_3 supporting a message payload of 2048 bytes. In FIG. 6, for the purposes of an example, the message structures 340A are illustrated as TLV structures.

Based on the size of the first message payload 348A, the second message structure 340A_2 may be selected (indicated by a star designation in FIG. 6). The selection may be based on a determination that the 256 bytes of the second message structure 340A_2 is the smallest message structure 340 that can contain the first message payload 348A of 128 bytes.

A second message payload 348B may be received having a second message payload type of "B" and the second message payload 348B may have a size of 1 byte. A subset 510B of the available message structures 340 may be determined that are associated with the second type. The subset 510B may include message structures 340 having different sizes. For example, the subset 510B associated with the type of "B" may have a first message structure 340B_1 supporting a message payload of 2 bytes, a second message structure 340B_2 supporting a message payload of 16 bytes, and a third message structure 340B_3 supporting a message payload of 256 bytes.

Based on the size of the second message payload 348B, the first message structure 340B_1 may be selected. The selection may be based on a determination that the 2 bytes of the first message structure 340B_1 is the smallest message structure 340 that can contain the second message payload 348B of 1 byte.

A third message payload 348C may be received having a third message payload type of "C" and the third message payload 348C may have a size of 512 bytes. A subset 510C of the available message structures 340 may be determined that are associated with the third type. The subset 510C may include message structures 340 having different sizes. For example, the subset 510C associated with the type of "C" may have a first message structure 340C_1 supporting a message payload of 256 bytes, a second message structure 340C_2 supporting a message payload of 1024 bytes, and a third message structure 340C_3 supporting a message payload of 4096 bytes.

Based on the size of the third message payload 348C, the second message structure 340C_2 may be selected. The selection may be based on a determination that the 1024 bytes of the second message structure 340C_1 is the smallest message structure 340 that can contain the third message payload 348C of 512 bytes.

In this way, three message structures 340A_2, 340B_1, 340C_2 may be selected and populated with respective ones of the first, second and third message payloads 348A, 348B, 348C. A message 180 may be constructed that incorporates the three message structures 340A_2, 340B_1, 340C_2 as variable-sized fields 330 of the message 180. The total variable fields size 332 of the message 180 may be populated based on the sizes of the three message structures 340A_2, 340B_1, 340C_2. Similarly, the fixed-size fields segment 320 and message kind 310 of the message 180 may be populated (e.g., based on the contents of the message 180). In some embodiments, a single memory allocation may be made for the message 180 that is based on the sizes of the fixed-size fields segment 320 and the variable-sized fields segment 330. For example, a size of the single memory allocation for the message 180 may be based on the respective sizes of the various message structures 340 selected for the message 180. In the example of FIG. 6, for instance, a single memory allocation for the message 180 may be based on the sizes of the three message structures 340A_2, 340B_1, 340C_2 selected for the message 180.

It should be noted an allocation of the three message structures 340A_2, 340B_1, 340C_2 may be made utilizing a constant-sized allocation of a message 180 having a predetermined size, even though a size of the data being placed in the message structures 340 was not known in advance. As a result, the message 180 may be passed to the buffer 190 utilizing the streamlined process of FIG. 2B.

Moreover, the example illustrated in FIG. 6 (as well as the method of FIG. 4) utilize fewer resources than other methods which may be used to avoid dynamically-sized message allocations. For example, one method to avoid dynamically-sized message allocations (so as to use the streamlined buffer process) involves the use of message allocations that always allocate the maximum size of the message. The example of FIG. 6 illustrates the benefit over such a method.

In FIG. 6, it is assumed that the maximum size of the first message payload 348A is 2048 bytes, the maximum size of the second message payload 348B is 256 bytes, and the maximum size of the third message payload 348C is 4096 bytes. If the maximum size of the message payload 348 were used in the allocation of the message 180, 2048+256+4096=6400 bytes of memory would have been allocated. In sharp contrast, utilizing the method shown by example in FIG. 6, 256+2+1024=1282 bytes of memory are allocated for the message 180, which is approximately one-fifth of the amount of the worst-case scenario.

The method described herein allows for different types of message structures 340 to be tailored for different types of message payloads 348. This allows data that has high variability to be assigned to different buckets in a particular message type that may take advantage of knowledge about characteristics of the type. For example, if a type of the message payload 348 is associated with a particular filename, it may be known that a filename can be as large as 1024 characters, but is often less than 20 characters. Thus, message structures 340 can be provided in a subset 510 of message structures 340 associated with that particular message type that support a largest size of 1024, but also have other message structures 340 of smaller sizes.

In this way, embodiments of the present disclosure support not only the improved performance of streamlined buffer operations, but also result in a use of fewer memory resources than some other techniques. The techniques associated with the present disclosure also allow for the satisfaction of criteria utilized in verification operations (e.g., verification of constant vs. dynamic message allocation) in embodiments such as eBPF and the like.

Figure 7:
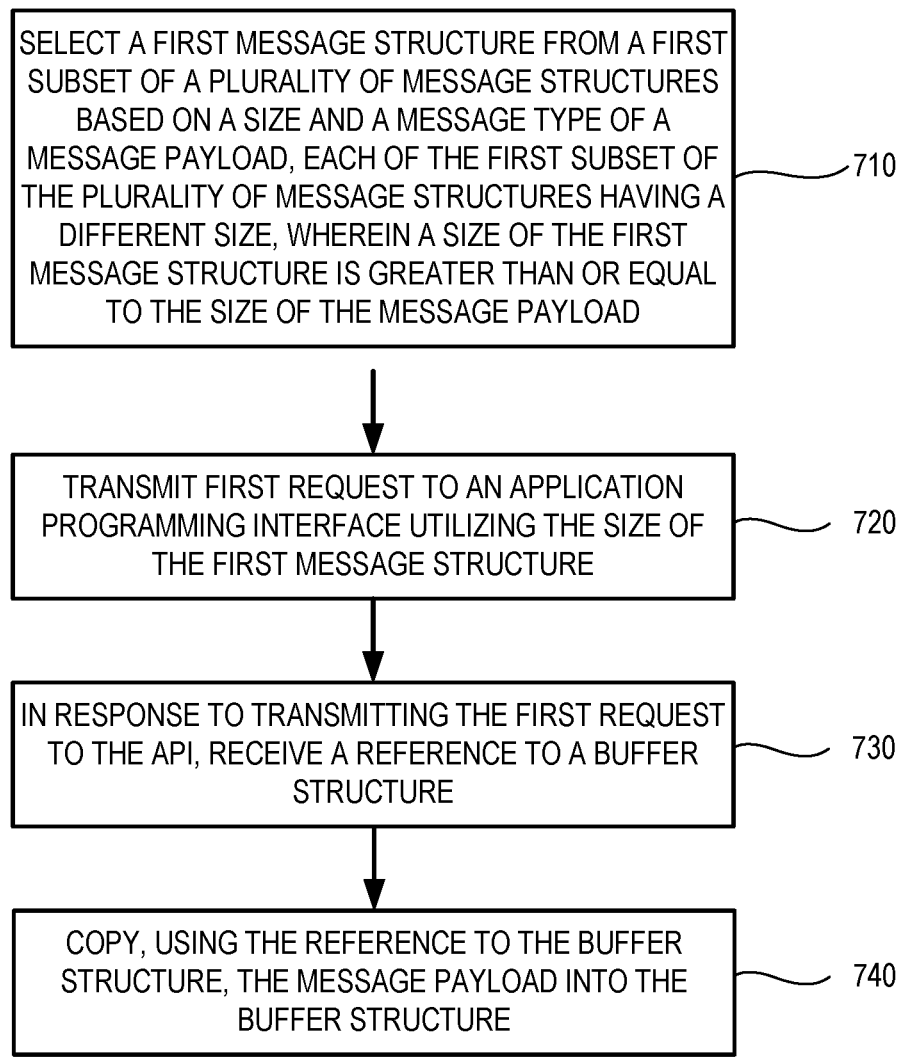
FIG. 7 is a flow diagram of a method of allocating variable-sized message structures, according to some embodiments of the present disclosure.

FIG. 7 is a flow diagram of a method of allocating variable-sized message structures, in accordance with some embodiments of the present disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by a computing device (e.g., computing device 120).

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 600. It is appreciated that the blocks in method 700 may be performed in an order different than presented, and that not all of the blocks in method 700 may be performed.

Referring simultaneously to the prior figures as well, the method 700 begins at block 710, in which a first message structure 340 is selected from a first subset 510 of a plurality of message structures 340 based on a size of a message payload 348 and a message type of the message payload 348. Each of the first subset 510 of the plurality of message structures may have a different size 344, and a size 344 of the first message structure 340 may be greater than or equal to the size of the message payload 348.

In some embodiments, the message type of the message payload 348 is a first message type of a plurality of message types. Each of the plurality of message structures 340 may be associated with one of the plurality of message types 342, and each of the first subset 510 of the plurality of message structures 340 may be associated with the first message type. In some embodiments, each of a second subset 510 of the plurality of message structures 340 is associated with a second message type 342, different from the first message type, and each of the second subset 510 of the plurality of message structures 340 has a different size 344.

At block 720, a first request is transmitted to an API 230 utilizing the size of the first message structure 340. In some embodiments, the API is exported by an extended Berkeley packet filter (eBPF) infrastructure executing on the computing device. In some embodiments, the first request to the API 230 comprises a reserve request for a ring buffer entry 220 having a constant size.

At block 730, in response to transmitting the first request to the API 230, receive a reference to a buffer structure 220. In some embodiments, the reference to the buffer structure 220 comprises an address of the buffer structure 220.

At block 730, the message payload 348 is copied into the buffer structure 220 using the reference to the buffer structure 220. In some embodiments, the message payload 348 is copied into the buffer structure 220 utilizing the address of the buffer structure 220 provided by the API 230.

In some embodiments, the method 700 further includes transmitting a second request to the API 230 to submit the message payload 348 in the buffer structure 220. In some embodiments, the method 700 further includes performing a verification operation that verifies that the size of the first message structure 340 of the first request to the API 220 has a constant value.

Figure 8:
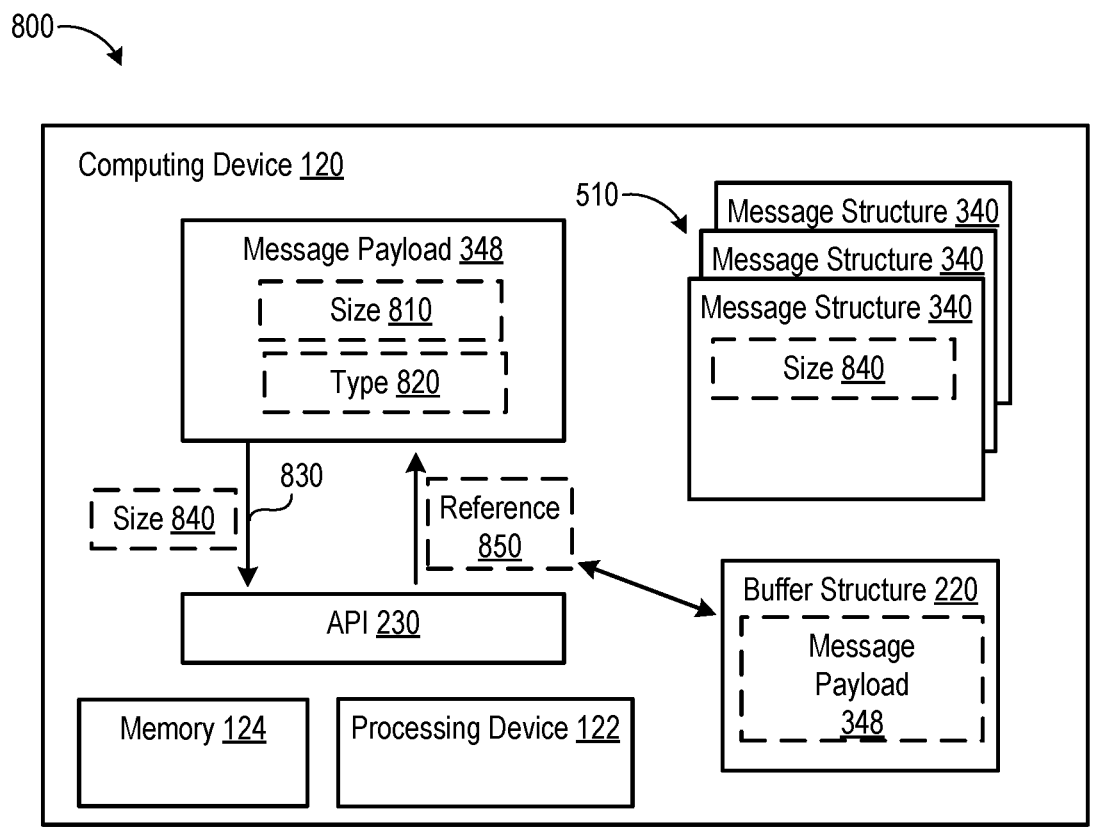
FIG. 8 is a component diagram of an example of an architecture configured to allocate variable-sized message structures, in accordance with embodiments of the disclosure.

FIG. 8 is a component diagram of an example of an architecture 800 configured to allocate variable-sized message structures, in accordance with embodiments of the disclosure. The device architecture 800 includes computing device 120 having processing device 122 and memory 124, as described herein with respect to FIGS. 1 to 7.

The computing device 120 (e.g., through operation of processing device 122) may select, based on a size 810 of a message payload 348 and a message type 820 of the message payload 348, a first message structure 340 from a first subset 510 of a plurality of message structures 340. In some embodiments, each of the first subset 510 of the plurality of message structures 340 may have a different size 840. A size 840 of the first message structure 340 is greater than or equal to that of the size 810 of the message payload 348. The first message structure 340 may be similar to the message structure 340 described herein with respect to FIGS. 1 to 7. For example, the first message structure 340 may be a TLV structure.

In some embodiments, the selection of the first message structure 340 may be part of an operation performed by an application extension 150 provided by an application 140 for execution in the kernel space 130 of an operating system 115 of the computing device 120, as discussed herein with respect to FIG. 1. In some embodiments, the selection of the first message structure 340 may be part of an operation performed within an eBPF infrastructure.

A first request 830 may be transmitted to an API 230 utilizing the size 840 of the first message structure 340. The API 230 may be similar to the API 230 discussed herein with respect to FIG. 2B. In some embodiments, the first request 830 to the API 230 may be a reserve request for a ring buffer entry having a constant size.

A reference 850 may be received (e.g., from the API 230) in response to the first request 830. The reference 850 may be a reference to a buffer structure 220. The buffer structure 220 may be similar to the buffer structure 220 discussed herein with respect to FIG. 2B. In some embodiments, the reference 850 may be an address of the buffer structure 220.

The computing device 120 may copy the message payload 348 into the buffer structure 220 using the reference 850 to the buffer structure 220. In some embodiments, the message payload 348 may be copied as part of a message 180 into the buffer structure 220. In some embodiments, the message payload 348 may be copied to the buffer structure 220 as part of the first message structure 340.

The device architecture 800 of FIG. 8 provides an improved capability for message allocation and/or message communication. The device architecture 800 allows for more efficient processing operations to be performed for message allocation in scenarios in which the size of the associated message allocation is not known in advance. The techniques illustrated as part of FIG. 8 may be performed in an eBPF environment to leverage message passing between user space and kernel space processes, while still performing message allocations that may be verified to be constant message allocations, so as to avoid additional memory operations to process message structures into a ring buffer.

Figure 9:
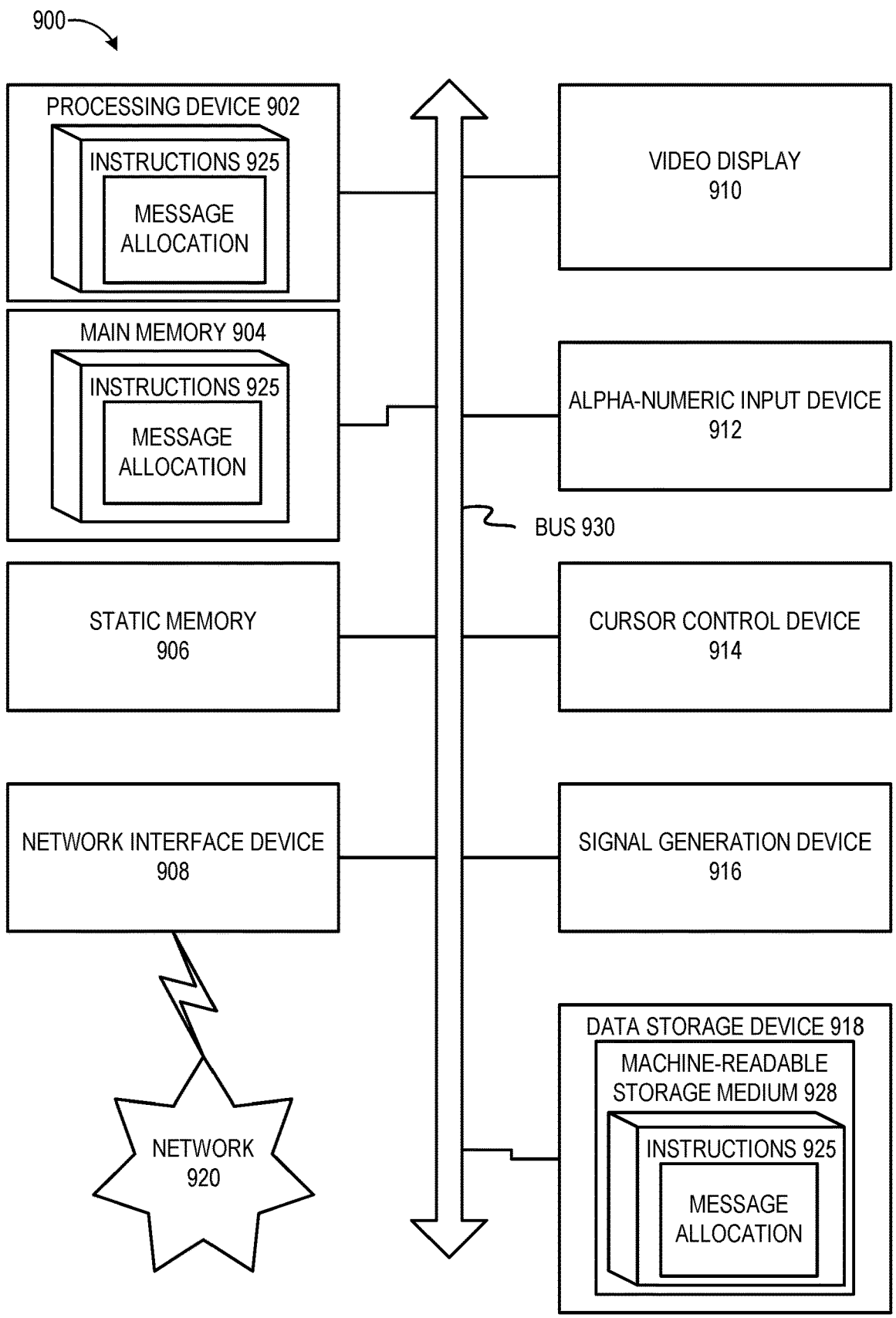
FIG. 9 is a block diagram of an example computing device that may perform one or more of the operations described herein, in accordance with embodiments of the disclosure.

FIG. 9 is a block diagram of an example computing device 900 that may perform one or more of the operations described herein, in accordance with some embodiments of the disclosure. Computing device 900 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 900 may include a processing device (e.g., a general purpose processor, a PLD, etc.) 902, a main memory 904 (e.g., synchronous dynamic random access memory (DRAM), read-only memory (ROM)), a static memory 906 (e.g., flash memory and a data storage device 918), which may communicate with each other via a bus 930.

Processing device 902 may be provided by one or more general-purpose processing devices such as a microprocessor, central processing unit, or the like. In an illustrative example, processing device 902 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also include one or more special-purpose processing devices such as an application specific integrated circuit (ASIC), a field programmable gate array (FPGA), a digital signal processor (DSP), network processor, or the like. The processing device 902 may execute the operations described herein, in accordance with one or more aspects of the present disclosure, for performing the operations and steps discussed herein.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Data storage device 918 may include a computer-readable storage medium 928 on which may be stored one or more sets of instructions 925 that may include instructions for application 140 and/or an application extension 150 for carrying out the operations described herein, in accordance with one or more aspects of the present disclosure. Instructions 925 may also reside, completely or at least partially, within main memory 904 and/or within processing device 902 during execution thereof by computing device 900, main memory 904 and processing device 902 also constituting computer-readable media. The instructions 925 may further be transmitted or received over a network 920 via network interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "selecting," "transmitting," "receiving," "copying," "performing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method of variable memory allocation using constant sized structures for passing messages, the method comprising:
    selecting, by a processing device, a first message structure from a first subset of a plurality of message structures based on a size of a message payload and a message type of the message payload, wherein each of the first subset of the plurality of message structures has a different size, and wherein a size of the first message structure is less than a maximum size of the message type and greater than or equal to the size of the message payload;
    transmitting a first request to an application programming interface (API) utilizing the size of the first message structure;
    in response to transmitting the first request to the API, receiving a reference to a buffer structure; and
    copying, using the reference to the buffer structure, the message payload into the buffer structure.

2. The method of claim 1, wherein the first request to the API comprises a reserve request for a ring buffer entry having a constant size.

3. The method of claim 1, further comprising transmitting a second request to the API to submit the message payload in the buffer structure.

4. The method of claim 1, wherein the API is exported by an extended Berkeley packet filter (eBPF) infrastructure executing on a computing device.

5. The method of claim 1, wherein the reference to the buffer structure comprises an address of the buffer structure, and
    wherein the message payload is copied into the buffer structure utilizing the address of the buffer structure.

6. The method of claim 1, wherein the message type of the message payload is a first message type of a plurality of message types,
    wherein each of the plurality of message structures is associated with one of the plurality of message types, and
    wherein each of the first subset of the plurality of message structures is associated with the first message type.

7. The method of claim 6, wherein each of a second subset of the plurality of message structures is associated with a second message type, different from the first message type, and
    wherein each of the second subset of the plurality of message structures has a different size.

8. The method of claim 1, further comprising:
    performing a verification operation that verifies that the size of the first message structure of the first request to the API has a constant value.

9. A system for variable memory allocation using constant sized structures for passing messages, the system comprising:
    a memory; and
    a processing device, operatively coupled to the memory, to:
        select a first message structure from a first subset of a plurality of message structures based on a size of a message payload and a message type of the message payload, wherein each of the first subset of the plurality of message structures has a different size, and wherein a size of the first message structure is less than a maximum size of the message type and greater than or equal to the size of the message payload;

transmit a first request to an application programming interface (API) utilizing the size of the first message structure;

in response to transmitting the first request to the API, receive a reference to a buffer structure; and copy, using the reference to the buffer structure, the message payload into the buffer structure.

10. The system of claim 9, wherein the first request to the API comprises a reserve request for a ring buffer entry having a constant size.

11. The system of claim 9, wherein the processing device is further to transmit a second request to the API to submit the message payload in the buffer structure.

12. The system of claim 9, wherein the API is exported by an extended Berkeley packet filter (eBPF) infrastructure executing on the system.

13. The system of claim 9, wherein the message type of the message payload is a first message type of a plurality of message types, wherein each of the plurality of message structures is associated with one of the plurality of message types, and wherein each of the first subset of the plurality of message structures is associated with the first message type.

14. The system of claim 13, wherein each of a second subset of the plurality of message structures is associated with a second message type, different from the first message type, and wherein each of the second subset of the plurality of message structures has a different size.

15. The system of claim 9, wherein the processing device is further to perform a verification operation that verifies that the size of the first message structure of the first request to the API has a constant value.

16. A non-transitory computer-readable storage medium including instructions that, when executed by a processing device, cause the processing device to allocate variable memory using constant sized structures for passing messages by:

selecting, by the processing device, a first message structure from a first subset of a plurality of message structures based on a size of a message payload and a message type of the message payload, each of the first subset of the plurality of message structures has a different size, wherein a size of the first message structure is less than a maximum size of the message type and greater than or equal to the size of the message payload;

transmitting a first request to an application programming interface (API) utilizing the size of the first message structure;

in response to transmitting the first request to the API, receiving a reference to a buffer structure; and copying, using the reference to the buffer structure, the message payload into the buffer structure.

17. The non-transitory computer-readable storage medium of claim 16, wherein the processing device is further to transmit a second request to the API to submit the message payload in the buffer structure.

18. The non-transitory computer-readable storage medium of claim 16, wherein the message type of the message payload is a first message type of a plurality of message types, wherein each of the plurality of message structures is associated with one of the plurality of message types, and wherein each of the first subset of the plurality of message structures is associated with the first message type.

19. The non-transitory computer-readable storage medium of claim 18, wherein each of a second subset of the plurality of message structures is associated with a second message type, different from the first message type, and wherein each of the second subset of the plurality of message structures has a different size.

20. The non-transitory computer-readable storage medium of claim 16, wherein the processing device is further to perform a verification operation that verifies that the size of the first message structure of the first request to the API has a constant value.

\* \* \* \* \*